United States Patent
Athman et al.

(10) Patent No.: US 7,103,445 B2
(45) Date of Patent: Sep. 5, 2006

(54) SYSTEM AND METHOD FOR CONTROLLING THE DISPENSE RATE OF PARTICULATE MATERIAL

(75) Inventors: Michael Athman, Appleton, WI (US); Thomas A. Bett, Oshkosh, WI (US); Tanakon Ungpiyakul, Neenah, WI (US); Steven T. Moore, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 218 days.

(21) Appl. No.: 10/305,704

(22) Filed: Nov. 27, 2002

(65) Prior Publication Data

US 2004/0102871 A1    May 27, 2004

(51) Int. Cl.
*G07F 17/00* (2006.01)
(52) U.S. Cl. .................................... 700/240; 700/239
(58) Field of Classification Search ............... 700/240, 700/239
See application file for complete search history.

(56) References Cited

U.S. PATENT DOCUMENTS

| | | | |
|---|---|---|---|
| 4,087,506 A | 5/1978 | Cook et al. | |
| 4,340,556 A | 7/1982 | Ciencewicki | |
| 4,388,056 A | 6/1983 | Lee et al. | |
| 4,551,191 A | 11/1985 | Kock et al. | |
| 4,613,059 A * | 9/1986 | Merkel ........................ | 222/52 |
| 4,640,810 A | 2/1987 | Laursen et al. | |
| 4,675,209 A | 6/1987 | Pedigrew | |
| 4,699,823 A | 10/1987 | Kellenberger et al. | |
| 4,765,780 A | 8/1988 | Angstadt | |
| 4,767,586 A | 8/1988 | Radwanski et al. | |
| 4,800,102 A | 1/1989 | Takada | |
| 4,834,735 A | 5/1989 | Alemany et al. | |
| 4,843,576 A * | 6/1989 | Smith et al. ................. | 700/299 |
| 4,904,440 A | 2/1990 | Angstadt | |
| 4,908,175 A | 3/1990 | Angstadt | |
| 4,927,346 A * | 5/1990 | Kaiser et al. .............. | 425/81.1 |
| 4,927,582 A | 5/1990 | Bryson | |
| 4,987,854 A * | 1/1991 | Hall ........................... | 118/679 |
| 5,017,324 A | 5/1991 | Kaiser et al. | |
| 5,028,224 A | 7/1991 | Pieper et al. | |
| 5,128,082 A | 7/1992 | Makoui | |
| 5,143,680 A | 9/1992 | Molnar et al. | |

(Continued)

FOREIGN PATENT DOCUMENTS

EP    1 001 32 A1    5/2000

(Continued)

OTHER PUBLICATIONS

International Search Report for PCT/US 03/21824 dated Nov. 25, 2003, 3 pages.

*Primary Examiner*—Donald P. Walsh
*Assistant Examiner*—Michael E Butler
(74) *Attorney, Agent, or Firm*—Senniger Powers

(57) ABSTRACT

A system and method for dispensing super absorbent material (SAM) to a machine manufacturing absorbent articles as part of a manufacturing processing operation. A first controller stores process control data relating to the manufacturing processing operation and provides a first control signal that corresponds to the stored process control data. A second controller is responsive to the first control signal provided by the first controller for providing a dispensing signal. A SAM dispenser is responsive to the dispensing signal for dispensing the SAM to the machine at a start-up dispense rate when the machine is in a start-up mode and at an operating dispense rate when the machine is in a operating mode.

9 Claims, 11 Drawing Sheets

U.S. PATENT DOCUMENTS

| | | |
|---|---|---|
| 5,156,902 A | 10/1992 | Pieper et al. |
| 5,194,195 A * | 3/1993 | Okushima ................ 264/40.1 |
| 5,240,342 A * | 8/1993 | Kresa, Jr. ................ 403/232.1 |
| 5,248,524 A | 9/1993 | Soderlund |
| 5,384,550 A * | 1/1995 | Henely et al. ................ 331/17 |
| 5,395,564 A | 3/1995 | Frisbie et al. |
| 5,413,154 A * | 5/1995 | Hurst et al. ................ 141/83 |
| 5,429,788 A | 7/1995 | Ribble et al. |
| RE35,010 E * | 8/1995 | Price ................ 222/1 |
| 5,445,777 A | 8/1995 | Noel et al. |
| 5,490,846 A | 2/1996 | Ellis et al. |
| 5,514,324 A | 5/1996 | Bachar |
| 5,560,878 A | 10/1996 | Dragoo et al. |
| 5,567,472 A | 10/1996 | Siegfried et al. |
| 5,614,147 A | 3/1997 | Pelley |
| 5,666,325 A * | 9/1997 | Belser et al. ................ 367/95 |
| 5,750,066 A | 5/1998 | Vonderhaar et al. |
| 5,766,388 A | 6/1998 | Pelley et al. |
| 5,879,751 A | 3/1999 | Bogdanski |
| 6,033,199 A | 3/2000 | Vonderhaar et al. |
| 6,048,489 A | 4/2000 | Reiter et al. |
| 6,139,903 A * | 10/2000 | Baron et al. ................ 427/8 |
| 6,207,099 B1 | 3/2001 | Rooyakkers et al. |
| 6,267,575 B1 | 7/2001 | Rooyakkers et al. |
| 6,386,396 B1 | 5/2002 | Strecker |
| 6,811,301 B1 * | 11/2004 | Packard ................ 366/141 |
| 2001/0023996 A1 | 9/2001 | Suumen |

FOREIGN PATENT DOCUMENTS

EP 1138458 A2 * 10/2001

* cited by examiner

SYSTEM AND METHOD FOR CONTROLLING THE DISPENSE RATE OF PARTICULATE MATERIAL

FIELD OF THE INVENTION

The invention relates to a system and method for controlling an amount of particulate material added to absorbent articles during a manufacturing process by varying a dispense rate of the particulate material. In particular, this invention relates to a system and method for dispensing super absorbent material (SAM) to a machine manufacturing disposable absorbent articles by controlling a SAM dispenser to provide a start-up dispense rate and an operating dispense rate.

BACKGROUND OF THE INVENTION

Disposable absorbent articles have numerous applications including diapers, training pants, feminine care products, and adult incontinence products. A typical disposable absorbent article is formed as a composite structure including an absorbent assembly disposed between a liquid permeable bodyside liner and a liquid impermeable outer cover. These components can be combined with other materials and features such as elastic materials and containment structures to form a product which is specifically suited to its intended purposes.

For example, one such absorbent article is an infant's diaper, which typically includes components that are metered into the product in measured quantities. In particular, one such component generally included in an infant's diaper is SAM. Moreover, there is typically a target weight of the SAM in such articles. Achieving this target weight depends, in part, on the SAM dispense rate during a article manufacturing process. It has been discovered that the SAM dispense rate at machine start-up, and for some initial period thereafter, is often insufficient to achieve the target weight. Thus, a system is required for increasing the dispense rate of the SAM within this initial start-up period to reduce the number of articles produced containing insufficient amounts of SAM, and for maintaining the dispense rate at a level thereafter that reduces SAM waste.

Prior methods of controlling SAM specify the use of particulate regulating means such as a feed screw device which relies on gravitational forces to regulate the flow of particulate material such as SAM. Other methods include controlling the feed screw to yield an amount of particulate material to match a setting during a steady state operation. However, existing methods do not disclose controlling the feed screw to insure a proper amount of particulate material is dispensed during transient events such as machine startups.

In spite of past efforts, there is a need for improved methods and systems for controlling dispense rates of SAM during a manufacturing process.

The invention described below addresses one or more of these and other disadvantages and needs.

SUMMARY OF THE INVENTION

In accordance with one aspect of the invention, a system is provided for dispensing material. The system includes a first controller that stores process control data that relates to the manufacturing processing operation. The first controller provides a first control signal that corresponds to the process control data. A dispenser is responsive to a dispensing signal for dispensing material to the machine at a dispense rate that corresponds to the dispensing signal. The dispenser has a start-up mode and an operating mode. A second controller responsive to the first control signal of the first controller provides the dispensing signal to the dispenser. The dispensing signal controls the dispenser at a start-up dispense rate when the machine is in the start-up mode, and controls the dispenser at an operating dispense rate when the machine is in the operating mode.

In accordance with another aspect of the invention, a method is provided for controlling a dispense rate of SAM in a manufacturing process. The method first includes defining a threshold line speed of the manufacturing process operation. The method further includes sensing a line speed of the manufacturing process operation. The method further includes comparing the line speed with the defined threshold speed. The method further includes increasing the dispense rate of the SAM when the sensed line speed is greater than the defined threshold speed, wherein the dispense rate is increased until the sensed dispense rate is equal to an overshoot dispense rate. The method further includes maintaining the dispense rate at or near the overshoot dispense rate for an overshoot time. The method further includes decreasing the dispense rate until the sensed dispense rate is equal to operating rate. The method further includes maintaining the dispense rate at or near the operating dispense rate thereafter.

Alternatively the invention may comprise various other methods and systems. Other objects and advantages will become apparent to those skilled in the art from the detailed description herein read in conjunction with the attached drawings.

BRIEF DESCRIPTION OF DRAWINGS

Corresponding reference characters indicate corresponding parts throughout the drawings.

DETAILED DESCRIPTION

The various aspects and embodiments of the invention will be described in the context of a disposable absorbent article, such as a disposable diaper, and the manufacture thereof. It is, however, readily apparent that the present invention could also be employed with other articles and other processes.

Figure 1:
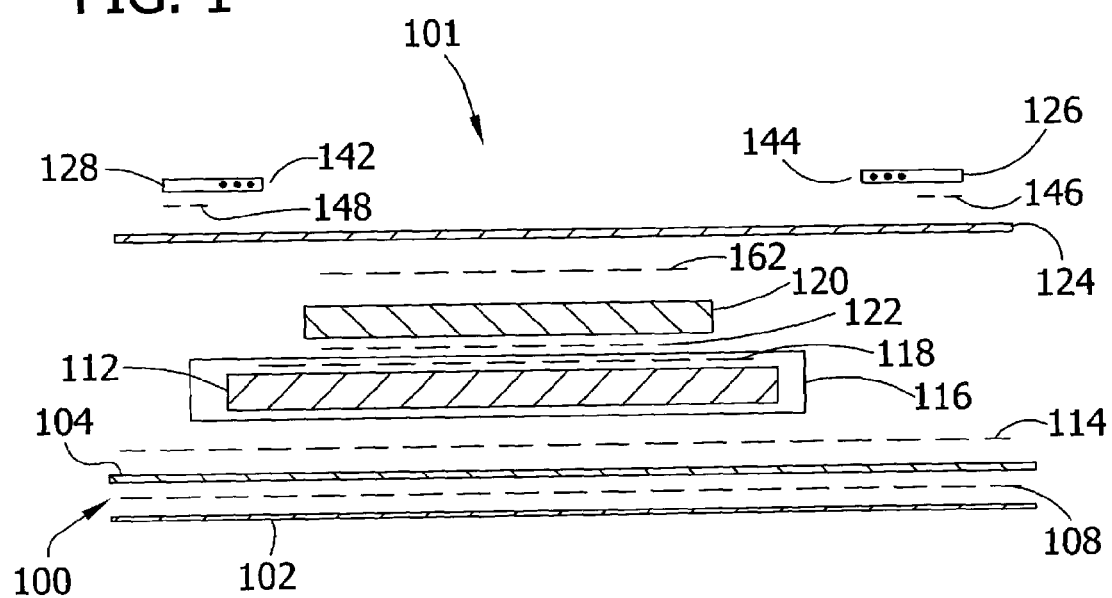
FIG. 1 is a cross sectional view of a diaper taken across line 8—8 of FIG. 3.
Figure 3:
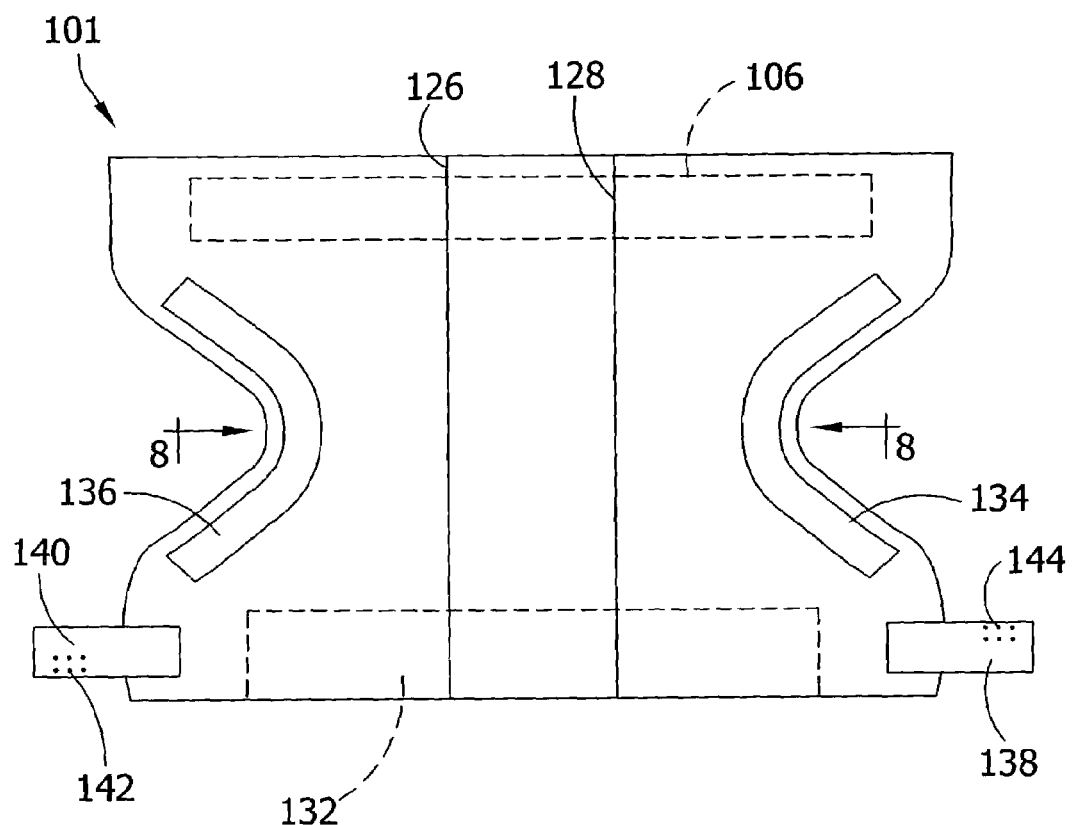
FIG. 3 is a top view of a diaper.

Referring now to FIG. 1, there is shown a cross-section of a diaper 101 along the line 8—8 of FIG. 3, which comprises generally an outer cover 100 which comprises an outer layer 102 and an inner layer 104. The outer cover 100 is desirably stretchable and may or may not be somewhat elastic. As used herein, the term "stretchable" refers to a material that may be extensible and/or elastic. That is, the material may be extended, deformed or the like, without breaking, and may or may not significantly retract after removal of an extending force.

The extensible outer cover 100 can be composed of various materials which provide the desired properties set forth herein. For example, the extensible outer cover 100 is desirably composed of a neckable or otherwise necked fabric, but may instead, or may additionally, be composed of a creped fabric, a crimped fiber fabric, an extendable fiber fabric, a bonded-carded fabric, a micro-pleated fabric, polymer films or the like. The fabrics may be woven or nonwoven materials, such as spunbond fabrics.

U.S. Pat. No. 4,965,122 entitled REVERSIBLY NECKED MATERIAL, by M. T. Morman which issued Oct. 23, 1990, the entire disclosure of which is hereby incorporated by reference in a manner consistent with the present document, discloses a process for providing a reversibly necked nonwoven material which may include necking the material, then heating the necked material, followed by cooling.

As used herein, the term "neckable material or layer" means any material which can be necked such as a nonwoven, woven, or knitted material. The term "necked material" refers to any material which has been drawn in at least one dimension, (e.g. lengthwise), reducing the transverse dimension, (e.g. width), such that when the drawing force is removed, the material can be pulled back to its original width. The necked material typically has a higher basis weight per unit area than the un-necked material. When the necked material is pulled back to its original un-necked width, it should have about the same basis weight as the un-necked material. This differs from stretching/orienting a material layer, during which the layer is thinned and the basis weight is permanently reduced.

Typically, such necked nonwoven fabric materials are capable of being necked up to about 80 percent. For example, the extensible outer cover 100 may be composed of a material which has been necked from about 10 to about 80 percent, desirably from about 20 to about 60 percent, and more desirably from about 30 to about 50 percent for improved performance. For the purposes of the present disclosure, the term "percent necked" or "percent neckdown" refers to a ratio or percentage determined by measuring the difference between the pre-necked dimension and the necked dimension of a neckable material, and then dividing that difference by the pre-necked dimension of the neckable material and multiplying by 100 for percentage. The percent necked can be determined in accordance with the description in the above-mentioned U.S. Pat. No. 4,965, 122.

The outer cover 100 is desirably a multi-layered laminate structure, and more desirably a necked, multi-layer laminate structure, to provide the desired levels of extensibility as well as liquid impermeability and vapor permeability. For example, the outer cover 100 of the illustrated embodiment is of two-layer construction, including an outer layer 102 constructed of a vapor and liquid permeable necked material and an inner layer 104 constructed of a liquid impermeable material, with the two layers being secured together by a suitable laminate adhesive 108. The outer cover may also be a single layer.

Referring now to FIG. 3, diaper 101 also includes a loop material or "pub patch" 106 adhesively bound to the outer cover for receiving hook material for fastening or closing the diaper during wear. The loop material may include a nonwoven fabric having continuous bonded areas defining a plurality of discrete unbonded areas. The fibers or filaments within the discrete unbonded areas of the fabric are dimensionally stabilized by the continuous bonded areas that encircle or surround each unbonded area, such that no support or backing layer of film or adhesive is required. The unbonded areas are specifically designed to afford spaces between fibers or filaments within the unbonded area that remain sufficiently open or large to receive and engage hook elements of the complementary hook material. In particular, a pattern-unbonded nonwoven fabric or web may include a spunbond nonwoven web formed of single component or multi-component melt-spun filaments. For example, the pub patch may be formed from a laminated structure including a polyethylene component and a polypropylene component adhesively bonded together and the polypropylene component is outwardly facing to accept a hook-type fastener.

At least one surface of the nonwoven fabric can include a plurality of discrete, unbonded areas surrounded or encircled by continuous bonded areas. The continuous bonded areas dimensionally stabilize the fibers or filaments forming the nonwoven web by bonding or fusing together the portions of the fibers or filaments that extend outside of the unbonded areas into the bonded areas, while leaving the fibers or filaments within the unbonded areas substantially free of bonding or fusing. The degree of bonding or fusing within the bonding areas desirably is sufficient to render the nonwoven web non-fibrous within the bonded areas, leaving the fibers or filaments within the unbonded areas to act as "loops" for receiving and engaging hook elements. Examples of suitable point-unbonded fabrics are described in U.S. Pat. No. 5,858,515 entitled PATTERN-UNBONDED NONWOVEN WEB AND PROCESS FOR MAKING THE SAME, by T. J. Stokes et al., the entire disclosure of which is incorporated herein by reference in a manner consistent with the present document.

Referring again to FIG. 1, diaper 101 additionally comprises an absorbent core 112 which can be adhesively bonded to a tissue wrap 116 (also commonly referred to as a tissue wrap sheet) by adhesive 118. Alternatively, the absorbent core need not have a tissue wrap and can simply be sandwiched between the outer cover and the bodyside liner. Absorbent core 112 may have any of a number of shapes, including rectangular, I-shaped, or T-shaped and is desirably narrower in the crotch region than in the front or back regions of the diaper 101. The size and the absorbent capacity of absorbent core 112 will be selected according to the size of the intended wearer and the liquid loading imparted by the intended use of the diaper. Further, the size and the absorbent capacity of the absorbent core 112 can be varied to accommodate various sized wearers. In addition, it has been found that the densities and/or basis weights of the absorbent core 112 can be varied. In the embodiment described herein, the absorbent core 112 typically has an absorbent capacity of at least about 300 grams of synthetic urine.

The absorbent core 112 desirably includes hydrophilic fibers and SAM, as described more fully below. Various types of wettable, hydrophilic fibrous material can be used to form the absorbent core 112. Examples of suitable fibers include naturally occurring organic fibers composed of intrinsically wettable material, such as cellulosic fibers; synthetic fibers composed of cellulose or cellulose derivatives, such as rayon fibers; inorganic fibers composed of an inherently wettable material, such as glass fibers; synthetic fibers made from inherently wettable thermoplastic polymers, such as particular polyester or polyamide fibers; and synthetic fibers composed of a nonwettable thermoplastic polymer, such as polypropylene fibers, which have been hydrophilized by appropriate means. The fibers may be hydrophilized, for example, by treatment with silica, treatment with a material which has a suitable hydrophilic moiety and is not readily removable from the fiber, or by sheathing the nonwettable, hydrophobic fiber with a hydrophilic polymer during or after the formation of the fiber. For the purposes of the present invention, it is contemplated that selected blends of the various types of fibers mentioned above may also be employed.

The high absorbency material may be in any of a wide variety of geometric forms. As a general rule, it is preferred that the high absorbency material be in the form of discrete particles or beads. However, the high absorbency material may also be in the form of fibers, flakes, rods, spheres, needles, or the like. In general, the high absorbency material is present in the absorbent core 112 in an amount of from about 5 to about 90 percent by weight, desirably in an amount of at least about 30 percent by weight, and even more desirably in an amount of at least about 50 percent by weight based on a total weight of absorbent core 112.

An example of high-absorbency material suitable for use in the absorbent core 112 is SANWET IM 3900 polymer available from Hoechst Celanese, a business having offices in Portsmouth, Va. Other suitable superabsorbents may include FAVOR SXM 880 polymer obtained from Stockhausen, a business having offices in Greensboro, N.C.

Tissue wrap 116 can be adhesively bonded to surge management layer 120 with adhesive 122. Surge management layer 120 is typically less hydrophilic than the absorbent core 112 and has an operable level of density and basis weight to quickly collect and temporarily hold liquid surges, to transport the liquid from its initial entrance point and to substantially completely release the liquid to the absorbent core. This configuration is intended to minimize the likelihood of the liquid pooling and collecting on the portion of the diaper against the wearer's skin, thereby reducing the feeling of wetness by the wearer. The structure of the surge management layer 120 also generally enhances the air exchange within the diaper 101.

Various woven and nonwoven fabrics can be used to construct the surge management layer 120. For example, the surge management layer 120 may be a layer made of a melt-blown or spunbond web of synthetic fibers, such as polyolefin fibers. The surge management layer 120 may also be a bonded-carded-web or an airlaid web composed of natural and synthetic fibers. The bonded-carded-web may, for example, be a thermally bonded web that is bonded using low melt binder fibers, powder or adhesive. The webs can optionally include a mixture of different fibers. The surge management layer 120 may be composed of a substantially hydrophobic material, and the hydrophobic material may optionally be treated with a surfactant or otherwise processed to impart a desired level of wettability and hydrophilicity. As one example, the surge management layer 120 includes a hydrophobic, nonwoven material having a basis weight of from about 30 to about 120 grams per square meter.

The absorbent core 112 is typically positioned in liquid communication with the surge management layer 120 to receive liquids released from the surge management layer, and to hold and store the liquid. In the illustrated embodiment, the surge management layer 120 is a separate layer positioned over the absorbent core 112. The surge management layer 120 serves to quickly collect and temporarily hold discharged liquids, to transport such liquids from the point of initial contact and spread the liquid to other parts of the surge management layer 120, and then to substantially completely release such liquids into the absorbent core 112.

The surge management layer 120 can be of any desired shape. Suitable shapes include for example, circular, rectangular, triangular, trapezoidal, oblong, dog-boned, hourglass-shaped, or oval.

Additional materials suitable for the surge management layer 120 are set forth in U.S. Pat. No. 5,486,166 issued Jan. 23, 1996 in the name of C. Ellis et al. and entitled "FIBROUS NONWOVEN WEB SURGE LAYER FOR PERSONAL CARE ABSORBENT ARTICLES AND THE LIKE"; U.S. Pat. No. 5,490,846 issued Feb. 13, 1996 in the name of Ellis et al. and entitled "IMPROVED SURGE MANAGEMENT FIBROUS NONWOVEN WEB FOR PERSONAL CARE ABSORBENT ARTICLES AND THE LIKE"; and U.S. Pat. No. 5,364,382 issued Nov. 15, 1994 in the name of Latimer et al. and entitled "ABSORBENT STRUCTURE HAVING IMPROVED FLUID SURGE MANAGEMENT AND PRODUCT INCORPORATING SAME", the disclosures of which are hereby incorporated by reference in a manner consistent with the present document.

The surge management layer 120 may be adhesively bonded to the bodyside liner 124 with adhesive 162. The bodyside liner 124 is generally bonded to the inner layer 104 of outer cover 100 with adhesive 114 and is desirably pliable, soft feeling, and nonirritating to the wearer's skin, and is employed to help isolate the wearer's skin from the absorbent core 112. The bodyside liner 124 is less hydrophilic than the absorbent core 112, to present a relatively dry surface to the wearer, and is sufficiently porous to be liquid permeable, permitting liquid to readily penetrate through its thickness. A suitable bodyside liner 124 may be manufactured from a wide selection of web materials, but is desirably capable of stretching in at least one direction (e.g., longitudinal or lateral). Various woven and nonwoven fabrics including either or both synthetic and natural fibers can be used for the bodyside liner 124. For example, the bodyside liner 124 may be composed of a meltblown or spunbonded web of the desired fibers, and may also be a bonded-carded-web. Layers of different materials that may have different fiber deniers can also be used. The various fabrics can be composed of natural fibers, synthetic fibers or combinations thereof. For example, the bodyside liner may comprise a spunbonded polypropylene.

In particular embodiments, the bodyside liner 124 is desirably extensible and capable of extending along with the outer cover 100 for desired fit of the diaper on the wearer. For example, the bodyside liner 124 can be composed of various extensible materials such as a necked fabric, a creped fabric, a micro-pleated fabric, perforated polymer films or the like, as well as combinations thereof. The fabrics may be woven or nonwoven materials, such as spunbond fabrics, that may be elastic or non-elastic. Examples of suitable manufacturing techniques and suitable necked nonwoven fabric materials for such an extensible top sheet 61 are described in U.S. Pat. No. 4,965,122 entitled REVERSIBLY NECKED MATERIAL, by M. T. Morman which issued Oct. 23, 1990.

Figure 2:
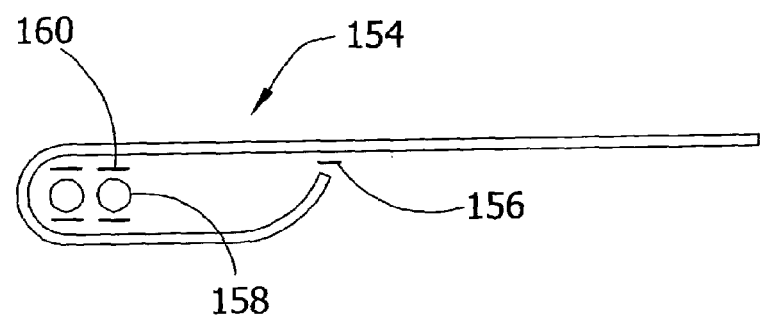
FIG. 2 is a cross sectional view of a containment flap.

Containment flaps 126 and 128 can be bonded to the outer cover, bodyside liner, or other intermediate layer. In the illustrated embodiment, the containment flaps 126 and 128 are bonded directly to the bodyside liner 124 with adhesive 146 and 148. Containment flaps are generally well known to those skilled in the art. For example, suitable constructions and arrangements for containment flaps are described in U.S. Pat. No. 4,704,116 issued Nov. 3, 1987 to K. Enloe, the disclosure of which is hereby incorporated by reference in a manner consistent with the present document. Containment flaps 126 and 128 can be bonded to the outer cover, bodyside liner, or other intermediate layer. In the illustrated embodiment, the containment flaps 126 and 128 are bonded directly to the bodyside liner 124 with adhesive 146 and 148. A suitable adhesive for bonding the containment flaps to the bodyside liner includes the adhesive of the present invention. Typically, the containment flaps are first formed outside of the diaper manufacturing process and subsequently introduced into the manufacturing process for attachment to the bodyside liner. As illustrated in FIG. 2, the containment flap 154 is formed off-line by folding the construction material for the containment flap 154 over onto itself and securing it with adhesive 156. The folding over of the material traps a stretchable material 158, secured to the containment flap 154 with adhesive 160, within the containment flap.

Referring now to FIG. 3, there is shown ears 138 and 140 (also commonly referred to as tabs or side panels) which are adhesively attached to diaper 101. Typically, the ears 138 and 140 are separately formed and attached to the outer cover, to the bodyside liner, between the outer cover and the bodyside liner, or to other suitable components located in the ear attachment zone of the diaper. The ears 138 and 140 may be elastic or otherwise rendered elastomeric. For example, the ears 138 and 140 may be an elastomeric material such as a neck-bonded laminate (NBL) or stretch-bonded laminate (SBL) material. Methods of making such materials are well known to those skilled in the art and are described in U.S. Pat. No. 4,663,220 issued May 5, 1987 to Wisneski et al., U.S. Pat. No. 5,226,992 issued Jul. 13, 1993 to Morman, and European Patent Application No. EP 0 217 032 published on Apr. 8, 1987 in the names of Taylor et al., the disclosures of which are hereby incorporated by reference in a manner consistent with the present document. Examples of articles that include elasticized side panels and selectively configured fastener tabs are described in U.S. Pat. No. 5,496,298 issued Mar. 5, 1996 to Kuepper et al.; U.S. Pat. No. 5,540,796 to Fries; and U.S. Pat. No. 5,595,618 to Fries; the disclosures of which are also incorporated herein by reference in a manner consistent with the present document. Alternatively, the ears 138 and 140 may be formed integrally with a selected diaper component. For example, the ears 138 and 140 can be integrally formed with the inner or outer layer of the outer cover or may be integrally formed from with the bodyside liner.

Fastening components, such as hook fasteners 142 and 144 are typically employed on the ears 138 and 140 to secure the diaper 101 on the body of a child or other wearer by connecting the ears 138 and 140 to the pub patch (loop fastener) previously described. The hook fasteners 142 and 144 are adhesively bonded (not shown) to the ears 138 and 140. Alternatively, other fastening components (not shown), such as buttons, pins, snaps, adhesive tape fasteners, cohesives, mushroom-and-loop fasteners, or the like, may be employed. Desirably, the interconnection of the fastening components is selectively releasable and re-attachable. In the illustrated embodiment, the hook fasteners 142 and 144 are attached to and extend laterally out from the respective ears 138 and 140 at the back region of the diaper 101.

To provide improved fit and to help further reduce leakage of body exudates from the diaper 101, elastic components are typically incorporated into the diaper 101, particularly at the waist area and the leg areas. For example, as illustrated in FIG. 3, the diaper 101 has a waist elastic component 132 and leg elastics 134 and 136. The waist elastic 132 is configured to gather and shirr the end margins of the diaper 101 to provide a resilient, comfortable close fit around the waist of the wearer.

The leg elastic components are typically secured between the outer and inner layers of the outer cover, such as by being bonded to one or both layers by a laminate adhesive. It should be understood, however, that the leg elastic components may be secured between the outer and inner layers of the outer cover by other methods.

Each elastic component generally comprises an elongate substrate, such as a sheet or ribbon, having threads or strands of elastic material secured to the substrate in generally parallel, spaced relationship with each other. As an example, one suitable elastic material from which the elastic strands may be constructed is a dry-spun coalesced multi-filament elastomeric thread sold under the trade name LYCRA and available from E.I. du Pont de Nemours (Wilmington, Del.). The various components of the diaper 101 are integrally assembled together using a suitable form of attachment, such as a combination of adhesives, sonic bonds, thermal bonds.

Examples of other diaper configurations suitable for use in connection with the instant application that may or may not include diaper components similar to those described previously are described in U.S. Pat. No. 4,798,603 issued Jan. 17, 1989, to Meyer et al.; U.S. Pat. No. 5,176,668 issued Jan. 5, 1993, to Bernardin; U.S. Pat. No. 5,176,672 issued Jan. 5, 1993, to Bruemmer et al.; U.S. Pat. No. 5,192,606 issued Mar. 9, 1993, to Proxmire et al., and U.S. Pat. No. 5,509,915 issued Apr. 23, 1996 to Hanson et al., the disclosures of which are hereby incorporated by reference in a manner consistent with this document.

To insure that the complex articles described above are assembled accurately, the physical properties of the materials used during the assembly process must be properly controlled. As can be readily appreciated, although the invention is described in reference to controlling the delivery of SAM during an absorbent article assembly process, it is contemplated that the invention can control the delivery of any material during any process having a start-up mode and operating mode and/or any process which requires a period of time before reaching equilibrium. Moreover, it is contemplated that the invention can control the delivery of one or more materials separately or in combination.

For instance, the failure to provide a sufficient amount of SAM material in the absorbent core of such articles during the assembly process can affect the absorbency of the diaper, which can result in a defective product. Thus, by using a control scheme to control SAM delivery during the assembly process, the number of defective products produced during the assembly process can be reduced significantly.

In particular, absorbent articles such as diapers often have a target weight to achieve during the manufacturing process. Moreover, such articles often have target weights for materials added or dispensed to the absorbent article during the manufacturing process. As described above, one such material dispensed during the diaper manufacturing process is SAM. In one embodiment, a dispensing system such as described in the U.S. Pat. No. 6,461,086, the disclosure of which is incorporated herein by reference, is used to dispense the SAM. During machine start-ups, such embodiments often require a period of time to deliver a target amount of SAM to diapers. As a result, initial diapers produced by the manufacturing process contain less than the target weight of SAM. For example, the first 200 diapers produced by the assembly process 403 may contain less than the target amount of SAM. This presents quality issues for consumers and/or waste issues for manufacturers. During machine start-ups, the number of absorbent articles produced containing less than the target SAM weight can be reduced by temporarily overshooting a target dispense rate for the SAM material. Thus, controlling the dispense rate of materials such as SAM for some period after machine start-ups reduces the number of absorbent articles produced below the target weight.

Figure 4:
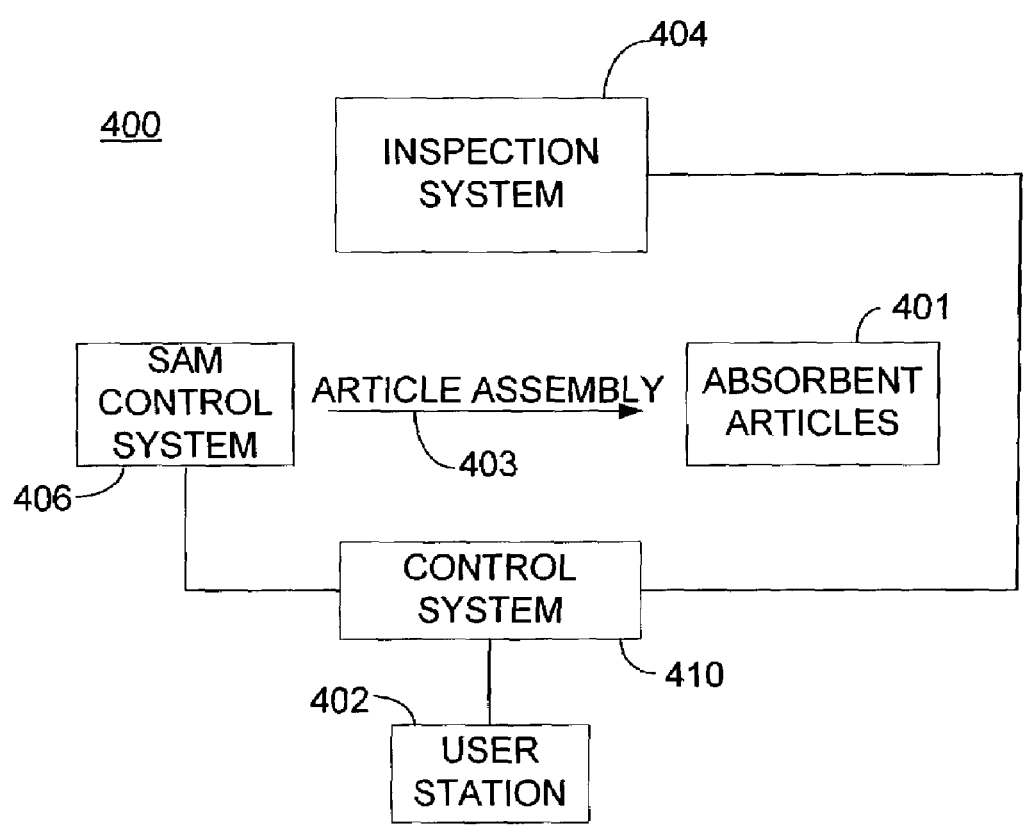
FIG. 4 is a block diagram illustrating a system for assembling pre-fastened articles such as absorbent articles.

Referring now to FIG. 4, a block diagram illustrates a system 400 for assembling absorbent articles 401 such as the diaper illustrated in FIGS. 1–3. A user station 402 and a manufacturing control system 410 control and monitor the assembly of absorbent articles 401 during an article assembly process, indicated by reference character 403. An inspection system 404 examines the assembled absorbent articles and detects and/or segregates defective absorbent articles. A SAM control system 406 is responsive to SAM control information for controlling the dispense rate of SAM during the assembly process 403. The manufacturing control system 410 is responsive to the inspection system 404, the SAM control system 406, and the user station 402. The SAM control system 406 may employ control system 410, as illustrated, or it may have its own control system (see FIG. 5). As illustrated in FIG. 4, the SAM control system 406 is located at the front end of the article assembly process 403. Consequently, the SAM control system 406 affects the article assembly process 403, and can affect what is detected by the inspection system 404 and can affect the quality of the absorbent articles 401 produced by the system 400. Thus, an invention directed toward SAM control during the article assembly process can be particularly instrumental in improving the quality of the absorbent articles 401 produced therefrom.

Figure 5:
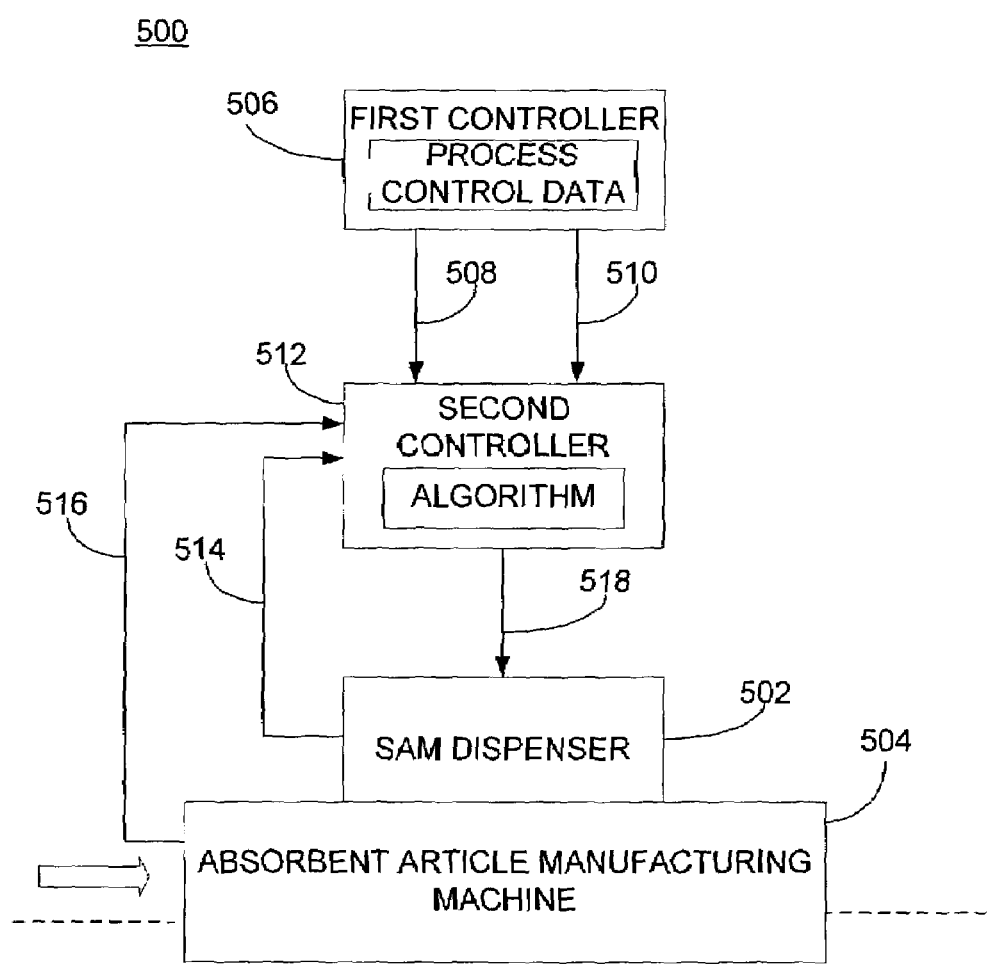
FIG. 5 is an exemplary block diagram illustrating a system for controlling the dispense rate of SAM being dispensed from a SAM dispenser to an absorbent article manufacturing machine.

Referring now to FIG. 5, an exemplary block diagram illustrates a system 500 for controlling the dispense rate of SAM being dispensed from a SAM dispenser 502 to an absorbent article manufacturing machine (machine) 504 such as the Gemini 450. Baby Diaper Machine available from Paper Converting Machine Co.

A first controller 506 such as an RELIANCE® AUTOMAX® Controller manufactured by Rockwell Automation stores process control data relating to one or more manufacturing processing operations. The first controller 506 generates one or more control signals representative of the stored process data. In one embodiment, an operator using an input device (not shown) such as a computer keyboard enters the process control data for storage in the first controller 506. In another embodiment (not shown), the process control data is automatically retrieved from a manufacturing database by the first controller. In this embodiment, the control signals include a SAM reference signal 508 and a machine reference signal 510. The SAM reference signal 508 is representative of a particular target dispense rate for dispensing SAM during a specific operating mode. In this instance, the SAM dispense rate is measured in grams per diaper (GPD). For example, during a start-up mode the SAM reference signal 508 may be representative of a target start-up dispense rate that varies from 0 GPD to 22 GPD. As an another example, during an operating mode the SAM reference signal 508 is representative of a target operating dispense rate such as 15 GPD. For example, during a start-up mode the SAM reference signal 508 may be representative of a target start-up dispense rate that varies from 0 GPD to 22 GPD. The SAM reference signal 508 also has a magnitude that corresponds to a non-operating dispense rate such as 0 GPD when the machine 504 is not operating (i.e., shut down). The machine reference signal 510 is representative of a particular target line speed of the machine 506. In this instance, the machine line speed is measured in diapers per minute (DPM). For example, during a start-up mode the machine reference signal 510 may be representative of a target start-up line speed that varies from 0 DPM to 1500 DPM.

A second controller 512 is linked to the first controller 506 for receiving the one or more control signals, and is linked to SAM dispenser 502 and machine 504 for receiving a SAM feedback signal 514 and a machine feedback signal 516, respectively. In one embodiment, second controller 512 is a Smart LOPO controller available from KKCC TRON Technologies, Inc. In one embodiment, a motor rotates a mechanism such as a feedscrew to dispense SAM, and generates the SAM feedback signal 514. (See FIG. 6, SAM feedback signal 608). Likewise, a motor (not shown) that drives the line speed of the machine 504 can generate the machine feedback signal 516. The SAM feedback signal 514 is representative of a detected dispense rate of SAM dispenser 502, and the machine feedback signal 516 is representative of a detected line speed of machine 504. The second controller 512 generates a dispensing signal 518 as a function of the one or more control signals 508, 510 received from the first controller 506 and the feedback signals 514, 516 received from the SAM dispenser 502 and machine 504. The dispensing signal 518 determines the dispense rate of the SAM during the start-up mode and during the operating mode. When the machine 504 begins operating, the second controller 512 calculates the magnitude of the SAM reference signal 508, and compares a threshold line speed, as defined by the process control data, to the detected line speed as indicated by the machine feedback signal 516. If the SAM reference signal 508 has a magnitude corresponding to the non-operating dispense rate, and the machine feedback signal 516 indicates that the detected line speed is greater than the threshold line speed, this indicates a start-up. After start-up is indicated, the second controller 512 controls the SAM dispenser 502 in start-up mode. During start-up mode, the second controller 512 provides the dispensing signal 518 to the SAM dispenser 502 to dispense the SAM at a start-up dispense rate.

In one embodiment, the second controller 512 generates the dispensing signal 518 as a function of process control variables included in the stored process data. The process control variables are retrieved from stored process data and in addition to the threshold speed may include an overshoot dispense rate, an acceleration gain, an overshoot time, and a deceleration gain. The overshoot dispense rate is representative of a maximum target dispense rate during the start-up mode and is greater than the operating dispense rate. For example, using values for the target start-up dispense rate (i.e., 0 GPD–22 GPD) and the operating dispense rate (i.e., 15 GPD) as described above, the overshoot dispense rate is equal to 22 GPD. In one embodiment, the overshoot dispense rate (e.g., 22 GPD) is defined as a percentage of the target operating dispense rate. For example, 100% of target operating rate corresponds to 0% overshoot, and 120% corresponds to 20% overshoot. As another example, using the values set forth above the overshoot rate (i.e., 22 GPD) could be defined as 146% of the target operating dispense rate (i.e., 15 GPD) or 46% overshoot. Although the dispense rate is described in terms of GPD, the dispense rate can also be described in terms of the rotational speed or revolutions per minute (RPM) of a mechanism which dispenses SAM as it rotates. (See FIG. 6, feedscrew 602). The threshold speed is the line speed of the machine 504 (e.g., 200 diapers per minute) at which the SAM dispenser 502 begins operating in start-up mode. The acceleration gain defines an acceleration rate for increasing the start-up dispense rate from the non-operating dispense rate to the overshoot dispense rate. The overshoot time defines the duration (e.g., 1 to 4 seconds) the start-up rate is maintained at the overshoot dispense rate. The deceleration gain defines a deceleration rate for decreasing the dispense rate of the SAM from the overshoot dispense rate to the operating dispense rate. (See FIG. 8 below). In an alternative embodiment, the process control variables retrieved from stored process data may include an undershoot dispense rate and an undershoot time. In such an embodiment, the undershoot dispense rate is representative of a target dispense rate during the start-up mode which is less than the operating dispense rate. (See FIG. 9 below).

Figure 5A:
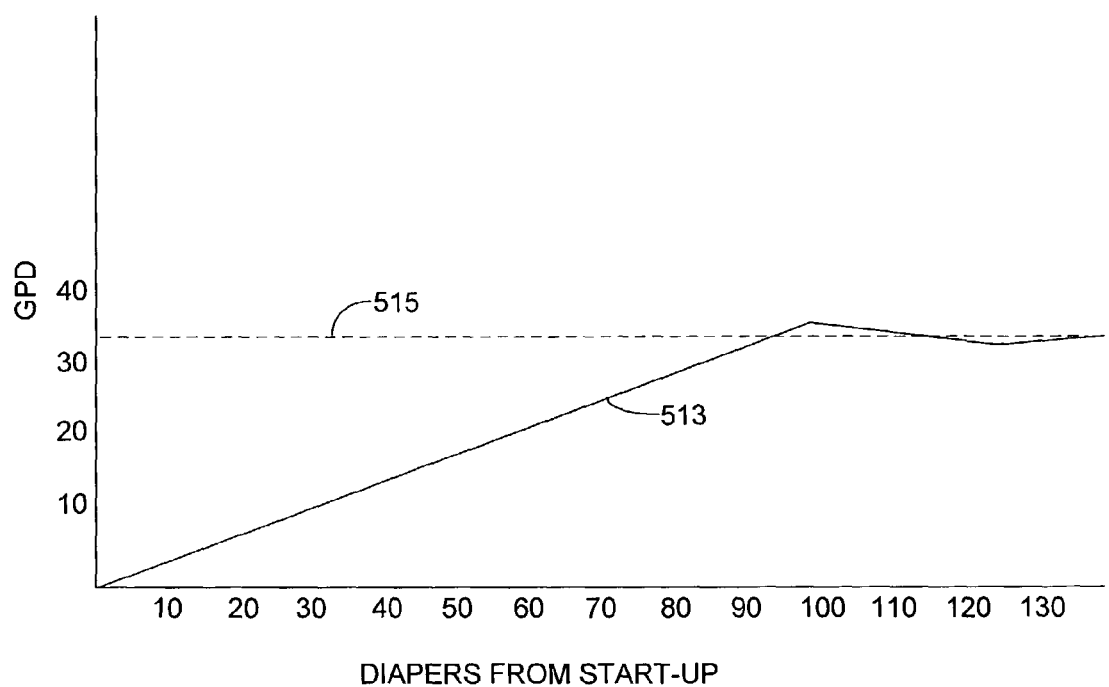
FIGS. 5A, 5B, and 5C are graphs illustrating weight profiles of SAM dispensed to absorbent articles.

In one embodiment, the above defined process variables are determined by examining a start-up SAM weight profile. The start-up SAM weight profile as indicated by line 513 is a plot of SAM weight per diaper versus diapers produced during start-up mode. (See FIG. 5A). The start-up SAM weight profile is compared to a target SAM weight profile as indicated by line 515 to determine whether the diapers produced during start-up mode contain the target amount of SAM. From this start-up SAM weight profile, it can be observed that approximately the first ninety (90) diapers received less than the target amount of SAM. As described above, the amount of SAM delivered to diapers during the start-up mode depends on the dispense rate of the SAM. Moreover, the number of diapers that receive the target amount of SAM during start-up depends on how fast the dispense rate is increased. For example, the greater the acceleration gain the faster the overshoot rate is reached and the faster diapers receive the target amount of SAM. In this case, the process control variables are selected to adjust the dispense rate such that diapers contain at or near the target amount of SAM within approximately the first twenty-five (25) diapers after start-up.

Figure 5B:
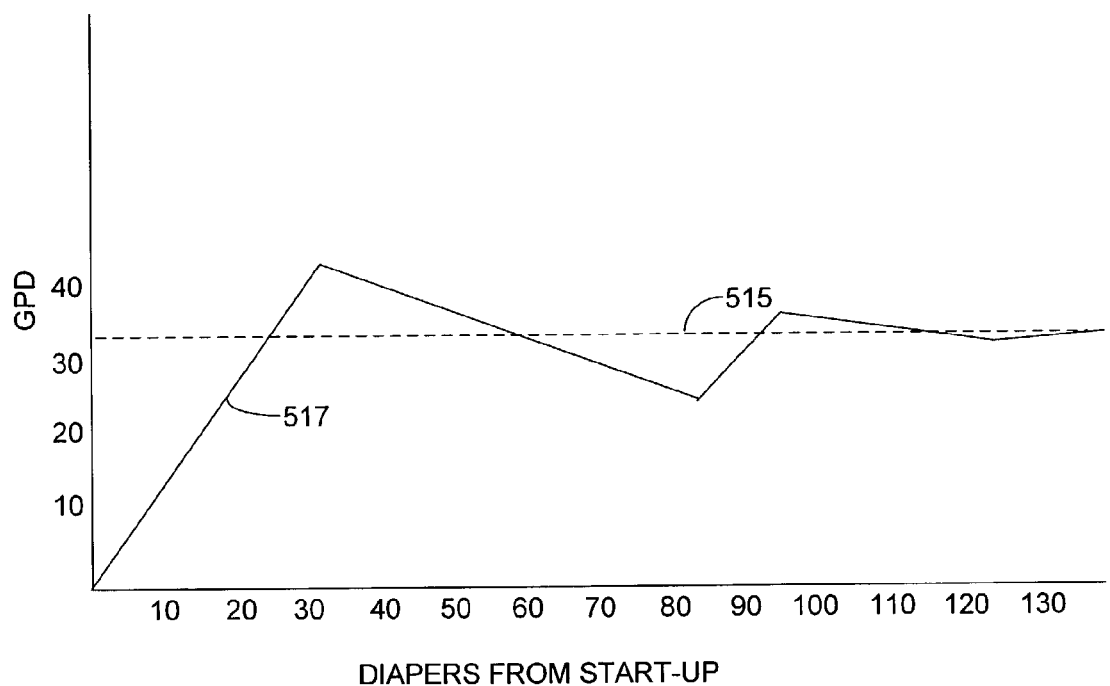
Figure 5C:
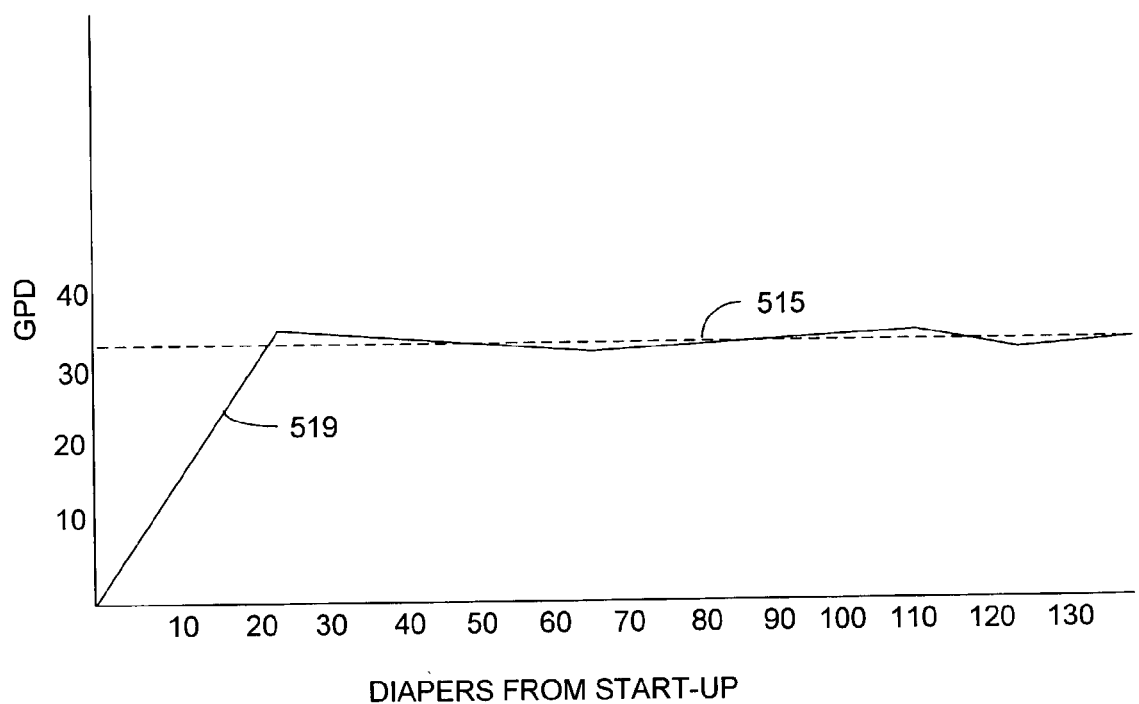

In one embodiment, the process variables are selected based on user experience. For example, by locating peaks and valleys on the start-up SAM weight profile with respect to the target SAM weight profile, an operator can select values for percent overshoot, acceleration gain, overshoot time, deceleration gain, and threshold speed based on experience or information retrieved from manufacturing reference manuals. After the operator enters the selected values as described above, a second start-up SAM weight profile as indicated by line 517 is determined by analyzing the diapers produced during a start-up mode according to the entered values (See FIG. 5B). In this case, it can be observed that diapers contain the target amount of SAM within twenty-five diapers after start-up. However, the overshoot percentage is too high, as indicated where line 517 is above the target SAM weight (i.e., 515). Furthermore, it can be observed that the overshoot rate is not sustained long enough as indicated where line 517 falls below line 515. The deceleration gain is selected to control rate at which the dispense rate decreases from the overshoot rate to the target operating dispense rate. Thus, the greater the deceleration gain the faster the target operating dispense rate is reached. The operator can continue to re-enter values for the process control variables until an optimized start-up SAM weight profile such as indicated by line 519 is obtained (See FIG. 5C). In this case, SAM weight profile 519 indicates that diapers contain an amount of SAM that is at or near the target amount within twenty-five diapers after start-up. After the optimized profile 519 is obtained, the corresponding process control values can be recorded.

Alternatively, the process control variables can be determined by employing a computer program that allows a user to adjust values of one or more process control variables to generate the desired start-up profile. For example, the computer program may use historical start-up weight profile data of a particular SAM dispenser to predict values for the process control variables.

During the start-up mode, the second controller 512 adjusts the dispensing signal 518 to increase the start-up dispense rate from the non-operating dispense rate to the target start-up dispense rate. In this embodiment, the second controller 512 develops a modified reference signal based on the SAM reference signal 508 and based on the acceleration gain. In other words, the modified reference signal corresponds to the SAM reference signal 508 increased by the acceleration gain. Because the dispensing signal 518 is a function of the modified reference signal, the dispensing signal 518 increases as the modified reference signal increases.

In one embodiment, as long as the SAM feedback signal 514 is below the target start-up rate, the second controller 512 continues to increase the magnitude of the modified reference signal until the modified reference signal corresponds to the overshoot dispense rate (i.e., target start-up rate). Subsequently, the second controller 512 maintains the dispensing signal 518 at a magnitude corresponding to the overshoot dispense rate for the overshoot time as defined by the retrieved process control variables. During the overshoot time, the second controller 512 adjusts the dispensing signal 518 by comparing the detected dispense rate, as indicated by the SAM feedback signal 514, to the overshoot dispense rate as indicated by the modified reference signal. For example, a SAM feedback signal 514 representing a detected dispense rate which is lower than the desired overshoot dispense rate indicates that the start-up dispense rate of the SAM dispenser 502 should be increased. In order to increase the start-up dispense rate, the second controller 512 increases the dispensing signal 518 as a function of the difference between the SAM feedback signal 514 and the modified reference signal.

Alternatively, a SAM feedback signal 514 representing a detected dispense rate that is greater than the overshoot dispense rate indicates that the start-up dispense rate of the SAM dispenser 502 should be decreased. In order to decrease the start-up dispense rate, the second controller 512 decreases the dispensing signal 518 as a function of the difference between the SAM feedback signal 514 and the modified reference signal. After expiration of the overshoot time, the second controller 512 decreases the dispensing signal 518 as a function of the deceleration gain applied to the modified reference signal. In this instance, the dispensing signal 518 is decreased from a magnitude corresponding to the overshoot dispense rate to a magnitude corresponding to the operating dispense rate. Thereafter, the second controller 512 operates the SAM dispenser 502 in an operating mode.

The operating mode immediately follows the start-up mode unless the machine 504 is shut down. During the operating mode, the second controller 512 adjusts the dispensing signal 518 by comparing the SAM reference signal 508, which is representative of the operating dispense rate during the operating mode, to the SAM feedback signal 514. For example, a SAM feedback signal 514 representing a detected dispense rate which is lower than the operating dispense rate indicates that the dispense rate of the SAM dispenser 502 should be increased. In order to increase the dispense rate, the second controller 512 increases the dispensing signal 518 as a function of the difference between the signals. Alternatively, a SAM feedback signal 514 representing a detected dispense rate which is greater than the operating dispense rate indicates that the dispense rate of the SAM dispenser 502 should be decreased. In order to decrease the dispense rate, the second controller 512 decreases the dispensing signal 518 as a function of the difference between the signals.

In one embodiment, the second controller 512 stores an algorithm. In this instance, the algorithm is defined by a series of steps such as described below in reference to FIG. 7. The second controller 512 is designed to retrieve specific process control variables from the first controller 506 and adjust the dispensing signal 518 as defined by the algorithm which is a function of the retrieved process variables.

In one embodiment, the SAM dispenser 502 is a volumetric feeder such as available from K-TRON® Technologies, Inc. The SAM dispenser 502 is responsive to a dispensing signal 518 for dispensing the SAM to the absorbent article manufacturing machine 504 at or near a dispense rate that corresponds to the dispensing signal 518. The SAM dispenser 502 also generates the SAM feedback signal 514 that corresponds to the detected dispense rate of the SAM. As described above, the dispensing signal 518 determines the dispense rate of SAM during the start-up mode and during the operating mode. During the start-up mode, the start-up dispense rate can range from the non-operating dispense rate to the overshoot dispense rate as defined by the retrieved process control variables. Although the operating dispense rate may also vary during the operating mode, the operation dispense rate corresponds to the operation of the SAM dispenser 502 when the dispense rate of the SAM is substantially maintained at or near the target operating dispense rate.

The machine 504 receives the SAM and produces absorbent articles. The machine 504 also generates the machine feedback signal 516 that corresponds to the line speed of the machine.

Figure 6:
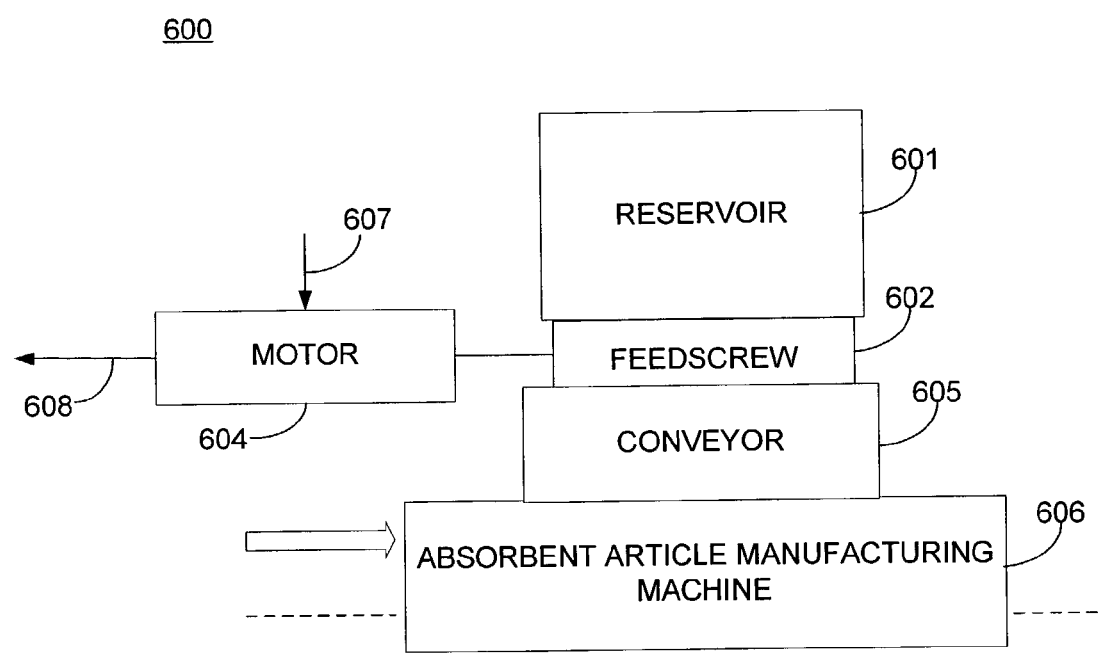
FIG. 6 is an exemplary block diagram illustrating a SAM dispenser comprising a reservoir, a feedscrew, a motor, and a conveyor.

Referring now to FIG. 6, there is shown an exemplary block diagram illustrating a SAM dispenser 600 comprising a reservoir 601, a feedscrew 602, a motor 604, and a conveyor 605. The reservoir 601 stores SAM and supplies SAM to the conveyor 605. The feedscrew 602 is mechanically linked to the reservoir 601 and regulates the rate at which the SAM is dispensed to the conveyor 605. As the conveyor 605 fills with SAM, the SAM is delivered to a machine 606 manufacturing absorbent articles. In one embodiment, the conveyor 605 is a transport conduit such as described in the above-mentioned U.S. Pat. No. 6,461,086. During operating mode operation, the conveyor 605 delivers SAM to machine 606 at a steady state rate (i.e., target amount per diaper). In this embodiment, the feedscrew 602 is mechanically linked to a rotor of the motor 604 such that when the motor 604 is activated, it rotates the rotor which causes the feedscrew 602 to rotate. The feedscrew 602 dispenses a greater amount of SAM to the conveyor 605 as the rotational speed of the motor 604 is increased, and dispenses a lesser amount of SAM to the conveyor 605 as the rotational speed of the motor 604 is decreased. The motor 604 is responsive to a dispensing signal 607 (from a second controller) to rotate the rotor and maintain the dispense rate of the SAM at the start-up dispense rate during the start-up mode and at the operating dispense rate during the operating mode. As the motor 604 rotates, a SAM feedback signal 608 that corresponds to the rotational speed of the rotor and feedscrew 602 is generated.

Alternatively, a weighing system that measures the weight of the SAM material delivered from the reservoir 601 generates the SAM feedback signal 608. For example, the weighing system may include a K-TRON K10S, weight loss controller and Model SFT load cells. Such a system is available from K-TRON International, Inc.

Prior to machine start-ups, the conveyor 605 is often purged of SAM. As a result, during machine start-ups, some period of time elapses before SAM is delivered the to the machine 606 at the steady state rate (i.e., target amount). By algorithmically controlling the rotational speed of feedscrew during start-up mode, the amount of time required to fill the conveyor 605 with SAM and deliver SAM at the steady state rate to machine 606 is reduced. Consequently, the number of diapers that receive a target amount of SAM during machine start-up is increased.

Figure 7:
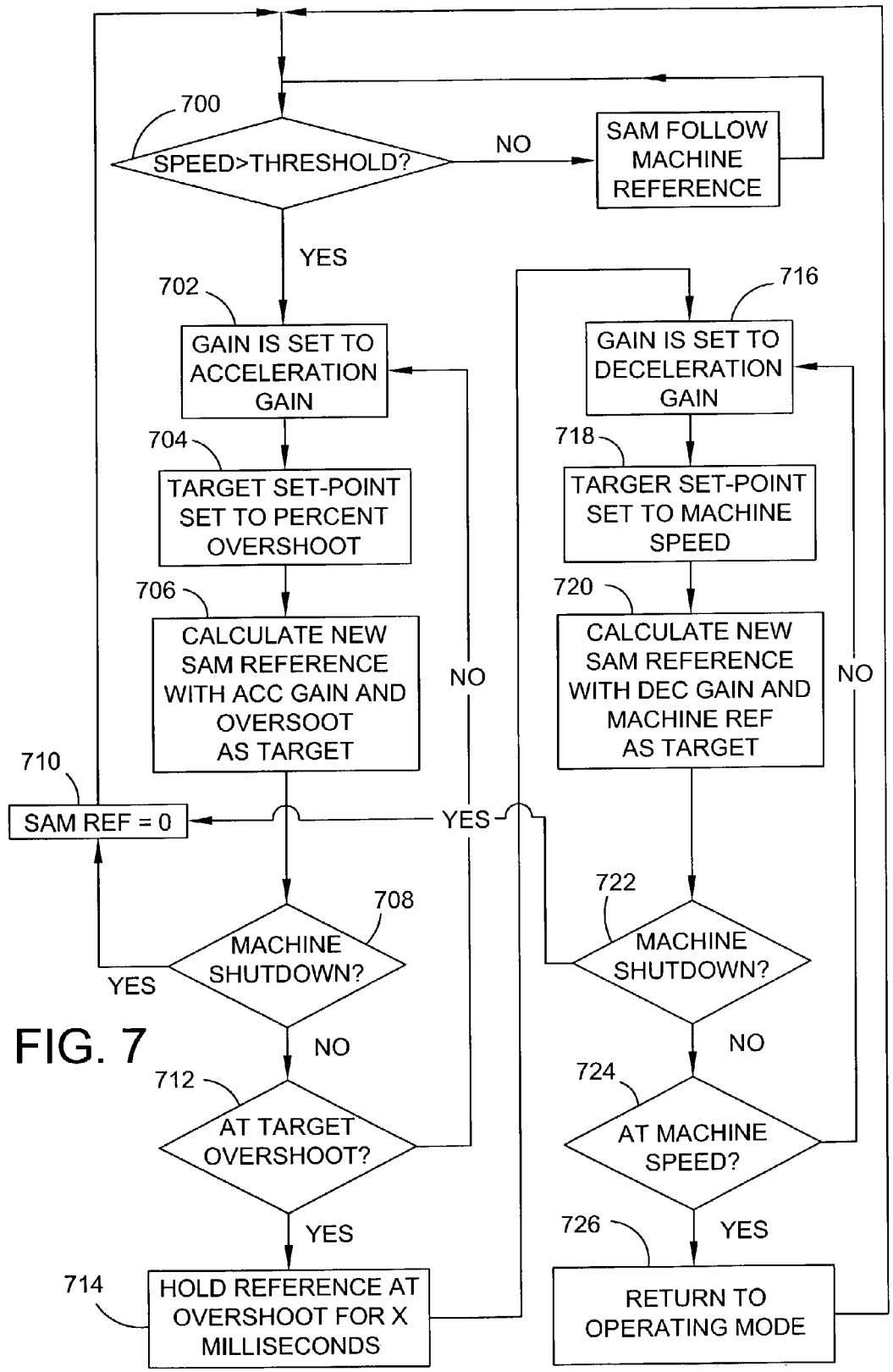
FIG. 7 is an exemplary flow chart illustrating a method for managing a manufacturing processing operation according to one preferred embodiment of the invention.

Referring now to FIG. 7, an exemplary flow chart illustrates a method for managing a manufacturing processing operation according to an exemplary embodiment described in reference to FIG. 5. After the machine 504 begins operating, the second controller 512 compares the line speed of machine 504, as indicated by machine feedback signal 516, to the threshold line speed as defined by the process control data. When the line speed is greater than the threshold line speed, an acceleration gain is retrieved from stored process data at step 702. If step 700 determines the line speed of machine 504 is less than the threshold line speed, the SAM dispenser 502 is operated at the non-operating dispense rate and the process returns to step 700 to monitor the line speed. The overshoot dispense rate (i.e., target start-up rate) is defined at step 704. At step 706, the second controller 512 calculates the modified reference signal as a function of the acceleration gain to accelerate the dispense rate of the SAM from the non-operating dispense rate to the overshoot dispense rate. The second controller 512 senses whether the machine 504 is shut down at step 708. If the machine 504 is shut down, the SAM reference signal 508 is reset to have magnitude corresponding to a non-operating dispense rate at step 710. If step 708 determines that the machine 504 is not shut down, the second controller 512 compares SAM feedback signal 514 to the modified reference signal at step 712. If the modified reference signal indicates that the dispense rate is less than the overshoot dispense rate, steps 702 through 708 are repeated. If step 712 determines that the dispense rate is equal to the overshoot dispense rate, the modified reference signal is maintained at the magnitude corresponding to the overshoot dispense rate for an overshoot time defined by stored process data at step 714. After the overshoot time expires, a deceleration gain is retrieved from process data at step 716. The target operating dispense rate is defined at step 718. At step 720, the second controller 512 calculates the modified reference signal as a function of the deceleration gain to decelerate the dispense rate of the SAM from the overshoot dispense rate to the target operating dispense rate. The second controller 512 senses whether the machine 504 is shut down at step 722. If the machine 504 is shut down, the modified reference signal is reset to have magnitude corresponding to a non-operating dispense rate. If step 722 determines that the machine 504 is not shut down, the second controller 512 compares the SAM feedback signal 514 to the modified reference signal at step 724. If the modified reference signal indicates that the dispense rate is greater than the target operating dispense rate, steps 716 through 722 are repeated. If step 724 determines that the dispense rate is equal to the target operating dispense rate, the dispense rate is maintained at or near the target operating dispense rate throughout the remainder of the manufacturing process at step 726.

Figure 8:
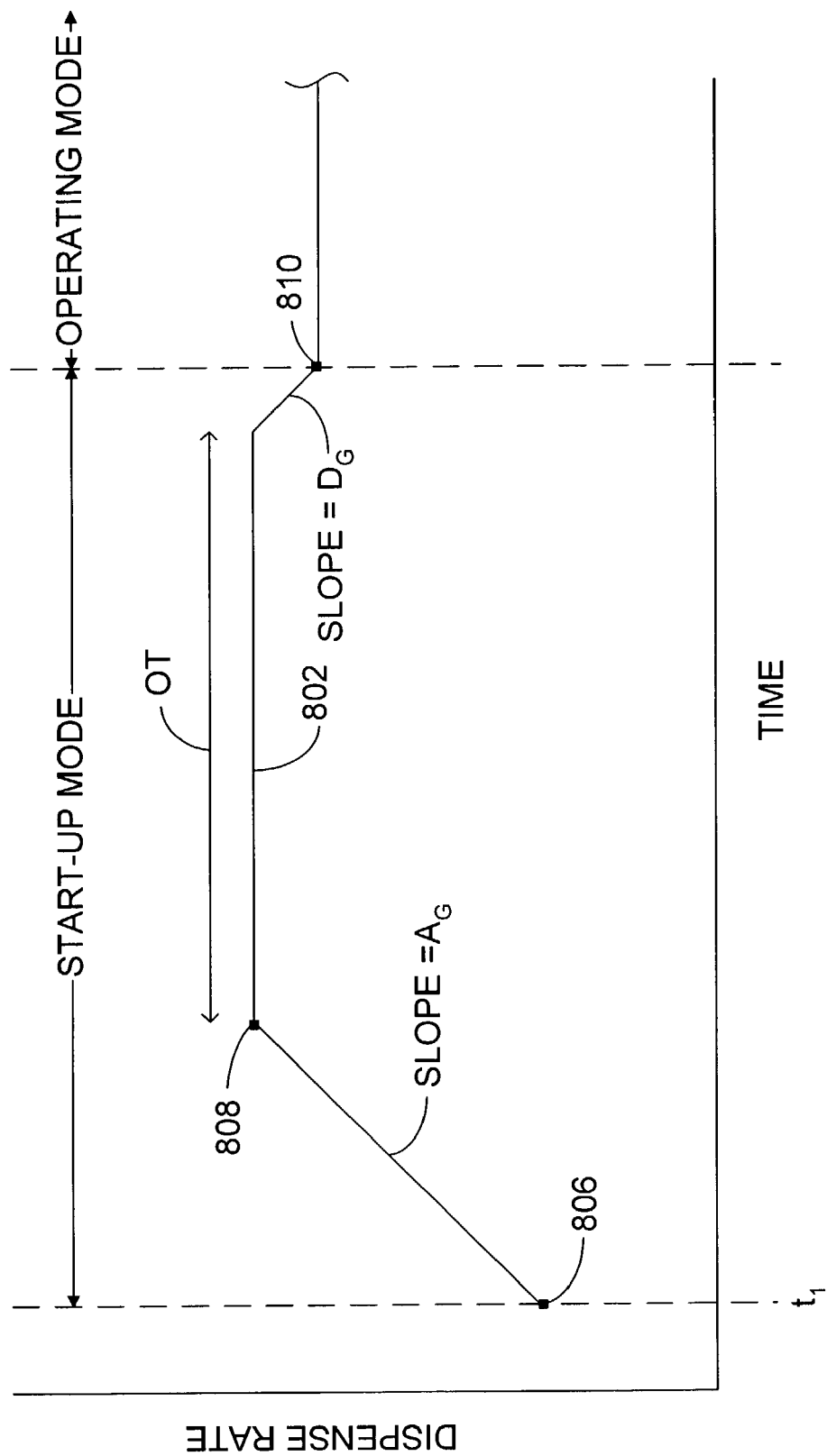
FIG. 8 is a graph illustrating dispense rates during the start-up mode and during the operating mode according to the embodiment described in reference to FIG. 5.

Referring to FIG. 8, an exemplary graph illustrates dispense rates (i.e., rotational speed of feedscrew) during the start-up mode and during the operating mode according to the embodiment described in reference to FIG. 6.

After machine 606 exceeds a threshold line speed at time $t_1$, the SAM dispenser 600 is controlled in the start-up mode. At the beginning of the start-up mode, the dispense rate of the SAM, as indicated by line 802, is increased at an acceleration rate corresponding to an acceleration gain $A_G$ as defined by the SAM dispensing signal 607 from a non-operating dispense rate 806 to a target start-up dispense rate. In this instance, the target start-up dispense rate is representative of an overshoot dispense rate. The acceleration gain AC corresponds to the slope of line 802 between the non-operating dispense rate 806 and target start-up dispense rate 808. After the dispense rate reaches the target start-up rate 808, it is maintained at the target start-up rate 808 for an overshoot time, OT, as defined by process data. After expiration of the overshoot time, OT, the dispense rate begins decreasing at a deceleration rate corresponding to a deceleration gain DG as defined by the SAM reference signal from the target start-up rate 808 to a target operating dispense rate 810. In this case, the deceleration gain DG corresponds to the slope of line 802 between the target start-up dispense rate 808 and the target operating dispense rate 810. After the dispense rate reaches the target operating dispense rate 810, the SAM dispenser 600 is controlled in the operating mode. During the operating mode, the dispense rate is maintained at or near the target operating dispense rate 810.

Figure 9:
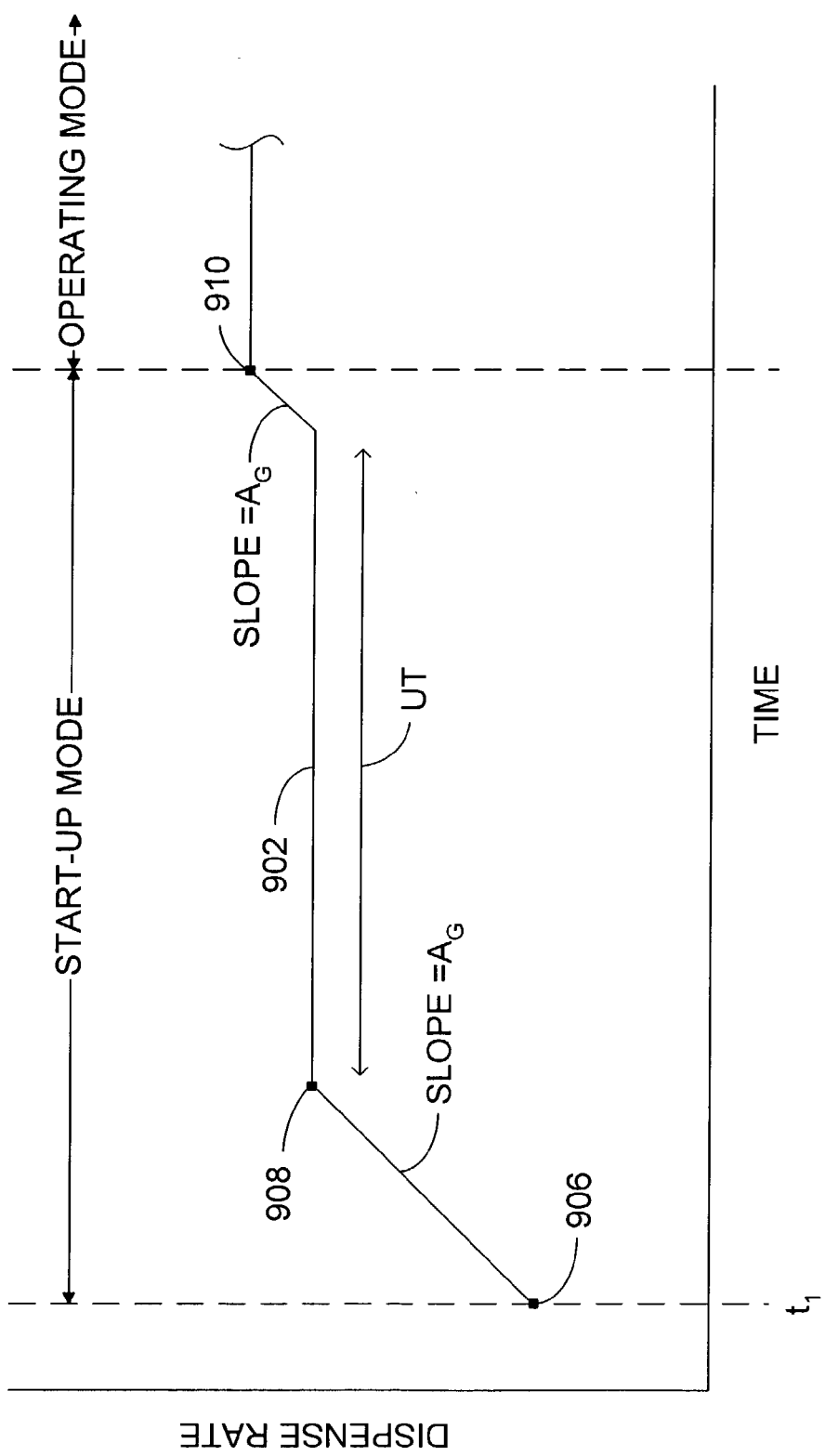
FIG. 9 is a graph illustrating dispense rates during the start-up mode and during the operating mode according to an embodiment described in reference to FIG. 5.

Referring to FIG. 9, an exemplary graph illustrates dispense rates (i.e., rotational speed of feedscrew) during the start-up mode and during the operating mode according to an alternative embodiment described in reference to FIG. 6.

After machine 606 exceeds a threshold line speed at time $t_1$, the SAM dispenser 600 is controlled in the start-up mode. At the beginning of the start-up mode, a dispense rate of the SAM, as indicated by line 902, is increased at an acceleration rate corresponding to an acceleration gain $A_G$ as defined by the SAM dispensing signal 607 from the non-operating dispense rate 906 to a target start-up dispense rate. In this instance, the target start-up dispense rate 908 is representative of an undershoot dispense rate. After the dispense rate reaches the target start-up dispense rate 908, it is maintained at the target start-up dispense rate 908 for an undershoot time, UT, as defined by process data. After expiration of the undershoot time, UT, the dispense rate is again increased at the acceleration rate corresponding to the acceleration gain $A_G$ as defined by the SAM reference signal from the target start-up dispense rate 908 to the target operating dispense rate 910. In this case, the acceleration gain $A_G$ corresponds to the slope of line 902 between the non-operating dispense rate 906 and target start-up dispense rate 908, and the slope of line 902 between the target start-up dispense rate 908 and target operating dispense rate 810. After the dispense rate reaches the target operating dispense rate 910, the SAM dispenser 600 is controlled in the operating mode. During the operating mode, the dispense rate is maintained at or near the target operating dispense rate 910.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A system for dispensing a super absorbent material (SAM) to a machine during a manufacturing process, the system comprising:
   a machine for manufacturing absorbent garments, said machine providing a reference signal corresponding to a line speed at which the machine is operating;
   a first controller providing a first control signal corresponding to process control data;
   a SAM dispenser responsive to a dispensing signal for dispensing SAM to the machine at a dispense rate corresponding to the dispensing signal wherein the SAM dispenser has a start-up mode and an operating mode; and
   a second controller responsive to the first control signal and the reference signal for providing the dispensing signal to the SAM dispenser for dispensing the SAM at a start-up dispense rate when the SAM dispenser is in the start-up mode, and at an operating dispense rate when the SAM dispenser is in the operating mode, and wherein during start-up mode the second controller adjusts the dispensing signal to increase the start-up dispense rate from a non-operating dispense rate to a target start-up overshoot dispense rate as a function of an acceleration gain as defined by the process control data, wherein said start-up overshoot dispense rate is greater than the operating dispense rate.

2. The system of claim 1, wherein the start-up overshoot dispense rate is a function of the target startup rate, and wherein the operating dispense rate is a function of a target operating rate.

3. The system of claim 1, wherein the second controller provides the dispensing signal corresponding to the start-up overshoot dispense rate for a duration of the start-up mode as defined by the process control data provided to the second controller by the first control signal.

4. The system of claim 1, wherein the stored process data includes an overshoot dispense rate for the SAM during the start-up mode and an overshoot time, wherein the first controller generates a reference signal that is representative of the overshoot dispense rate as defined by the stored process data and the SAM dispenser generates a feedback signal that is representative of the SAM dispense rate, wherein the second controller generates the dispensing signal as a function of the difference between the reference signal and the feedback signal, and wherein the generated dispensing signal is provided to the SAM dispenser to maintain delivery of the SAM at the overshoot dispense rate for the overshoot time during the start-up mode.

5. The system of claim 4, wherein the SAM dispenser is responsive to the dispensing signal to increase the dispense rate of the SAM during the operating mode when the feedback signal indicates that the dispense rate of the SAM is less than the operating dispense rate, and wherein the SAM dispenser is responsive to the dispensing signal during the operating mode to decrease the dispense rate of the SAM when the feedback signal indicates that the dispense rate of the SAM is greater than the operating dispense rate.

6. The system of claim 1, wherein the SAM dispenser comprises:
 a reservoir for storing SAM;
 a conveyor for receiving SAM from the reservoir and delivering the SAM to the machine;
 a feedscrew mechanically linked to the reservoir and the conveyor for dispensing the SAM to the conveyor, wherein the SAM is dispensed when the feedscrew rotates;
 a motor mechanically linked to the feedscrew for rotating the feedscrew; and
 a motor control circuit responsive to dispensing signal of the second controller for providing a motor signal to the motor, the motor responsive to motor signal for rotating the feedscrew.

7. The system of claim 1, wherein the stored process control data includes values for the following process control variables:
 an overshoot dispense rate;
 a threshold speed for indicating a line speed of the machine at which to operate the SAM dispenser in the start-up mode;
 an acceleration gain for indicating an acceleration rate for increasing the dispense rate of the SAM from a target dispense rate to the overshoot dispense rate at the beginning of the start-up mode;
 an overshoot time for indicating a duration of the start-up mode; and
 a deceleration gain for indicating a deceleration rate for decreasing the dispense rate of the SAM from the overshoot dispense rate to the target dispense rate at the end of the start-up mode, wherein the second controller receives the above variables and generates the dispensing signal provided to the SAM dispenser as a function of one or more of the above variables.

8. The system of claim 7, wherein the second controller uses an algorithm including the value of each process control variable to define the dispensing signal during the start-up mode, and wherein the second controller varies the dispensing to increase the dispense rate of the SAM from the non-operating dispense rate to the overshoot dispense rate, to maintain the dispense rate of the SAM at the overshoot dispense rate for the overshoot time, and then to decrease the dispense rate of the SAM from the overshoot dispense rate to the operating dispense rate.

9. The system of claim 1, wherein the SAM is dispensed to an absorbent article manufacturing machine for receiving the SAM and producing absorbent articles as part of a manufacturing processing operation.

* * * * *